(No Model.)

W. A. DUNLAP.
NUTMEG GRATER.

No. 527,837. Patented Oct. 23, 1894.

WITNESSES:
Darwin B. Wolcott
C. E. Hunt

INVENTOR,
William A. Dunlap
by George H. Christy
Att'y.

United States Patent Office.

WILLIAM A. DUNLAP, OF PITTSBURG, PENNSYLVANIA.

NUTMEG-GRATER.

SPECIFICATION forming part of Letters Patent No. 527,837, dated October 23, 1894.

Application filed February 23, 1894. Serial No. 501,130. (No model.)

*To all whom it may concern:*

Be it known that I, WILLIAM A. DUNLAP, a citizen of the United States, residing at Pittsburg, in the county of Allegheny and State of Pennsylvania, have invented or discovered certain new and useful Improvements in Nutmeg-Graters, of which improvements the following is a specification.

The invention described herein relates to certain improvements in nutmeg graters, and has for its object a construction whereby the grater may be firmly held in the hand in such manner that the feed of the nutmeg may be regulated by the pressure of the hand holding the instrument, while the grater is being reciprocated back and forth by the other hand. In general terms, the invention consists in the construction and combination substantially as hereinafter described and claimed.

Figure 1:
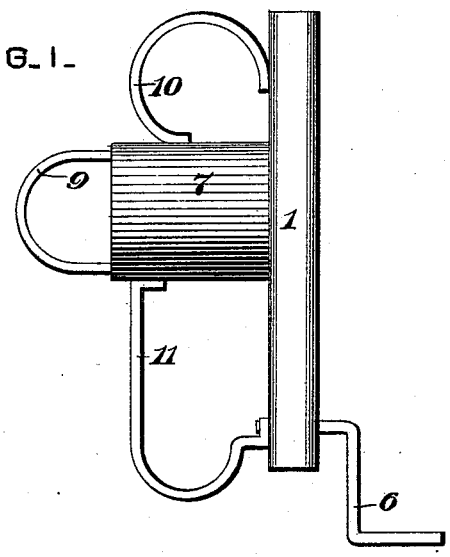
Figure 3:
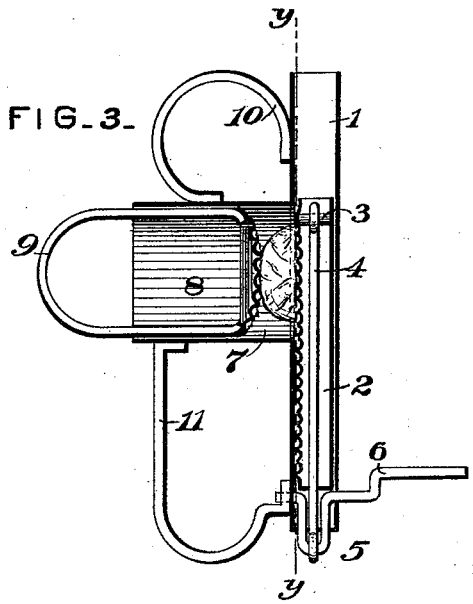
Figure 2:
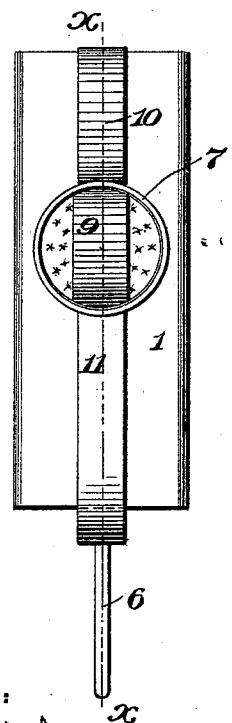
Figure 4:
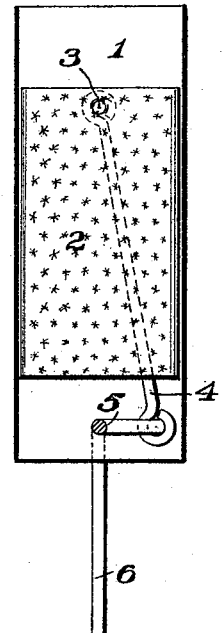

In the accompanying drawings forming a part of this specification, Figure 1 is a view in side elevation, of my improved grater. Fig. 2 is a top plan view of the same. Fig. 3 is a sectional elevation, the plane of section being indicated by the line $x, x$, Fig. 2, and Fig. 4 is a sectional view, the plane of section being indicated by the line $y, y$, Fig. 3.

In the practice of my invention I provide an oblong case or shell 1, preferably formed of sheet metal, in which is arranged the grater 2, having the form of a flattened tube provided on one side with a roughened surface and connected by a pin 3, to a link 4, whose opposite end is connected to a crank arm 5, whose operating handle 6 projects to one side of the case.

On one side of the case is secured a tube 7, for the reception of the nutmeg, which is forced against the grater through an opening in one side of the case 1, inside of the tube 7, by a plunger 8, having a handle 9 projecting beyond the end of the tube 7.

On one side of the tube 7 is placed a handle 10, for the reception of the thumb of the operator, and on the opposite side of the tube, is secured a handle 11, for two or more fingers of the operator, so that the palm of the hand of the operator will extend over the projecting handle of the plunger 8, so that by closing his fingers with more or less force, the nutmeg can be pressed against the grater with more or less pressure, while the grater is being reciprocated by the crank 6.

As shown in Fig. 3, the plunger 8 has its under side roughened, so as to take a firm hold on the nutmeg, and prevent its rotation by the reciprocating grater.

In my improved construction, the device can be held very firmly with one hand, while the grater can be reciprocated with comparative ease by the other hand.

I claim herein as my invention—

In a nutmeg grater, the combination of an oblong case or shell, a feed tube arranged at one side of the case or shell, a plunger arranged within the tube and provided with a handle projecting therefrom, handles for holding the grater arranged on opposite sides of the feed tube, and a reciprocating slide, having a roughened surface arranged within the shell, substantially as set forth.

In testimony whereof I have hereunto set my hand.

WILLIAM A. DUNLAP.

Witnesses:
 F. E. GAITHER,
 DARWIN S. WOLCOTT.